United States Patent [19]

Giovanniello et al.

[11] Patent Number: 5,603,912
[45] Date of Patent: Feb. 18, 1997

[54] BASIC ALUMINUM HYDROXYCHLOROSULFATE PROCESS AND PRODUCT THEREFROM

[75] Inventors: Rocco Giovanniello, Port Jervis; Anton Treuting, Cuddebackville, both of N.Y.

[73] Assignee: Westwood Chemical Corporation, Middletown, N.Y.

[21] Appl. No.: 404,492

[22] Filed: Mar. 17, 1995

Related U.S. Application Data

[63] Continuation-in-part of Ser. No. 148,777, Nov. 16, 1993, abandoned, which is a continuation-in-part of Ser. No. 954,115, Sep. 30, 1992, abandoned.

[51] Int. Cl.$^6$ ................................................ C01B 17/45
[52] U.S. Cl. ................................................ 423/467; 423/556
[58] Field of Search ................................ 423/467, 556, 423/555

[56] References Cited

U.S. PATENT DOCUMENTS

| | | | |
|---|---|---|---|
| 2,858,269 | 10/1958 | Holley | 210/42 |
| 3,497,459 | 2/1970 | Nakamura et al. | 252/312 |
| 3,544,476 | 12/1970 | Aiba | 252/175 |
| 3,929,666 | 12/1975 | Aiba | 252/317 |
| 4,981,673 | 1/1991 | Boutin | 423/467 |
| 5,246,686 | 9/1993 | Cuer et al. | 423/467 |

FOREIGN PATENT DOCUMENTS

| | | | |
|---|---|---|---|
| 3338624 | 4/1984 | Germany | 423/467 |

OTHER PUBLICATIONS

Tanaba, Hideo Studies on Aluminum Compounds I. Composition of Basic Aluminum Solution and Formation of $3Al_2O_3 \cdot 2SO_3$ Journ. Pharm. Sic. (Japan) 74, pp. 253–258 (1954) no month.

Dempsey, Brian A., Men, Xiaoxin, Bench Scale Production, Characterization and Application of Polyaluminum Sulfate American Water Works Association Research Foundation Research Report—Water Treatment (1989) no month.

Omelia, C. R., Gray, K. A. Polymeric Inorganic Coagulants American Water Works Association Research Foundation Research Report—Water Treatment no month (1989).

Raymond A. Smith Factors Affecting the Performance of Inorganic Coagulants in Water Treatment Intertech Conferences, Flocculants, Coagulants and Precipitants for Drinking Water and Water Treatment, Ramada Herndon, VA 1992 (Oct. 29/30).

*Primary Examiner*—Gary P. Straub
*Assistant Examiner*—Stuart L. Hendrickson
*Attorney, Agent, or Firm*—Anthony Lagani, Jr.

[57] ABSTRACT

An improved method for preparing a basic aluminum hyrdoxy-chlorosulfate is disclosed comprising reacting a basic aluminum chloride with a sulfate source, i.e. $H_2SO_4$ or aluminum sulfate, and modifying the reaction product by the addition of minor amounts of calcium containing compound and a water soluble iron salt. The product is useful in water treatment, is effective in cold water as well as low alkalinity water. A magnesium compound can be added to the composition where the calcium source contains no magnesium.

32 Claims, No Drawings

BASIC ALUMINUM HYDROXYCHLOROSULFATE PROCESS AND PRODUCT THEREFROM

CROSS REFERENCE TO RELATED APPLICATIONS

This application is a continuation-in-part of U.S. patent application Ser. No. 08/148,777, filed Nov. 16, 1993 which in turn is a continuation-in-part of U.S. patent application Ser. No. 07/954,115 filed Nov. 30, 1992, both now abandoned.

FIELD OF THE INVENTION

This invention relates to an improved process for preparing basic aluminum hydroxychlorosulfates. In particular it relates to the product therefrom and its use in water treatment.

BACKGROUND OF THE INVENTION

It is well known that various aluminum compounds can be used as a coagulant in the treatment of water. The most common of these compounds is alum. Notwithstanding the fact that they are more expensive, basic aluminum chlorides ("BAC") have found acceptance as coagulating agents because of their improved efficiency over alum. BAC has several advantages over alum. The BAC coagulants are effective in lower alkalinity water where alum is relatively ineffective, and BAC has a lesser impact on pH reducing the need for lime or caustic treating of water to bring it within the potable range. The coagulating plant operation is improved since with BAC there is a longer period between backwash. See for example U.S. Pat. Nos. 2,858,269, and 3,270,001 incorporated herein by reference. A more recent development has been the introduction of basic aluminum hydroxychloride sulfates ("BACS") for use as coagulating agents in water treatment.

BACS solutions are prepared by introducing di-valent sulfate ion into the BAC structure. Prior art methods for producing BAC are disclosed in U.S. Pat. Nos. 3,497,459; 3,544,476 and 4,981,673 all of which are incorporated herein by reference.

U.S. Pat. No. 3,544,476, discloses a method for preparing BACS by introducing an anion (Y) into the structure of a basic salt compound having the general formula $$M_n(OH)_m X_{3n-m}$$

M is a metal of tri or higher valency, X is an anion capable of forming a monovalent acid, 3n is greater than m and the basicity, defined as m/3nx100, is in the range of about 30 to 83%. Y is an anion capable of forming a di or greater valent acid. M can be aluminum, chromium or iron. Where M is aluminum and X is chlorine the basic compound is a BAC.

The anion, Y, is chemically introduced into the basic salt structure in the form of an acid or its soluble metal salt. Examples of Y are the anions of sulfuric, phosphoric, polyphosphoric, chromic, bichromic, carboxclic and sulfonic acids. X is preferably Cl, but can be I, $NO_3$ or $CH_3COO$. In this process the production of BAC is not an intermediate step along the route to the formation of a BACS.

The range of the ratio Y/M is about 0.015 to about 0.4. A BACS is formed by conducting the BACS forming reaction in the presence a multivalent acid ion in an acid hydrolysis solution, e.g hydrochloric acid of Al. The BACS may be obtained by the separation of an insoluble sulfate produced by the addition of the hydroxide, oxide or carbonate of calcium or barium to a solution of a normal salt of aluminum containing hydrochloric acid and sulfuric acid. the resulting product stream contains at least 10% or more by weight of the insoluble sulfate salt by-product.

U.S. Pat. No. 3,497,459 discloses and claims a method for preparing a basic salt compound having the formula $$R_n(OH)_m X_{3n-m}$$

wherein R can be aluminum and X can be Cl, which comprises the digestion of an oxide ore, e.g. bauxite, with a mixed acid system comprising sulfuric acid and hydrochloric acid. The resulting product solution is treated with an insoluble sulfate forming compound, e.g. calcium carbonate, to neutralize the sulfuric acid used. The reaction solution is filtered to remove the insoluble sulfate precipitate. The mother liquor is alleged to be stable.

The prior art has recognized that BAC may be reacted with sulfuric acid to form a basic aluminum sulfate precipitate for ratios of $SO_4/Al$ greater than 0.08. The '459 patent suggests that their process inherently passes through that reaction mechanism, but in the process of the '459 patent no such precipitate is formed.

U.S. Pat. No. 4,981,673 discloses a method for preparing a BAC which comprises reacting a solution of aluminum sulfate with a slurry comprising calcium carbonate and calcium chloride. The process stream is filtered to remove precipitate. The filtrate comprises a solution of a BACS of the formula $$Al_n(OH)_m(SO_4)_k Cl_{3n-m-2k}$$

having a basicity, m/3nx100, of about 40% to about 60% and an Al/Cl equivalent ratio, 3n/3n−m−2k of about 2.85 to 5.

While the prior art recognizes that a BACS can be prepared from a previously prepared BAC by introducing a sulfate ion into the bAC structure, it is uniformly agreed that these compositions are not effective in water treatment processes. The processes which do produce effective BACS result in the formation of byproduct precipitate the disposition of which reduces the cost effectiveness of the process as well as creating environmental problems.

SUMMARY OF THE INVENTION

An aluminum hydroxychlorosulfate (BACS) is prepared by reacting a solution of a basic aluminum halide with a sulfate ion derived from sulfuric acid or aluminum sulfate. The resulting product solution remains clear and no precipitate is formed. While the products formed have some utility in water treatment, they lack sufficient effectiveness in cold water or low alkalinity waters to be commercially acceptable. An improved product effective for the treatment of cold water or low alkalinity water is prepared by introducing a calcium ion in the form of calcium sulfate dihydrate, calcium carbonate, calcium chloride, calcium hydroxide, or a mixture thereof into the reaction mixture in an amount effective to improve product efficacy while not producing calcium sulfate precipitate by product.

DETAILED DESCRIPTION OF THE INVENTION

The initial step in producing the BACS of this invention is to prepare a basic aluminum chloride by any suitable known technique. In one prior art method a solution of aluminum chloride is reacted with aluminum to form the basic aluminum chloride. In another method of preparation of aluminum chlorhydrates, aluminum is reacted with HCl in water, the aluminum being in excess. While the concentration of basic aluminum chloride in the solution in which it is formed is not critical, generally it is made at concentration of 50% w/w for practical reasons.

In the practice of this invention, the initial basicity of the BAC solution is not critical. BAC solutions having a basicity of 1/2 to 5/6 have been used successfully. However, the Al Cl atomic ratio of the BAC solution must be adjusted to about 1.2/1 to about 0.70/1 before sulfate ion addition. The BACS of this invention has the general formula:

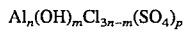

$$Al_n(OH)_mCl_{3n-m}(SO_4)_p$$

wherein 3n>m and the percent basicity, m/3nx100, is about 50% to about 73%. The value of p is selected such that the mole ratio $SO_4/Al$ is about 0.05 to about 0.20. In carrying out the process of this invention the concentration as $Al^{+3}$ is about 4.0 to about 12.5%. It will be appreciated by those skilled in the art that the source of $Al^{+3}$ can be both the BAC and the alum. Where the source of sulfate ion is sulfuric acid, however, all of the aluminum is supplied by the BAC.

The $SO_4/Al$ ratio may range from about 0.05 to about 0.20, preferably about 0.122 to about 0.150. The preferred BAC is 1/2 basic BAC. The preferred $SO_4/Al$ molar ratio for this starting material is about 0.10 to about 0.15. Preferably, the sulfate bonding reaction is carried out using a 1/2 basic BAC adjusted to an Al/Cl atomic ratio of about 1.0/1 to about. 0.70/1.

In carrying out the process of this invention a solution of basic aluminum chloride is heated to about 75° to about 98° C. with mixing. While a reflux condenser is utilized to return any water evaporated back to the system to maintain the concentration of reactants constant, true reflux conditions, per se, that is boiling, need not occur. The concentration of the hot solution or its basicity may be adjusted by the addition of water, aluminum chloride hexahydrate, hydrochloric acid or other basic aluminum chloride solutions of different concentrations or basicity as required. Methods of adjusting basicity are well known to those skilled in the art.

After adjustment the Al/Cl atomic ratio of the solution can range between 0.70/ to about 1.2/1; typically about 0.75/1 to about 1.0/1, e.g., about 0.78/1 to about 0.90/1. If adjustment is necessary it is preferred that the solution be maintained at about 90° to about 95° C. for about 10 to about 60 minutes after adjustment to ensure that the reaction is completed; preferably about 20 to about 50 minutes, e.g., 40 minutes. The solution is then preferably cooled to about 75° to about 90° C. before sulfating, more preferably about 75° to about 85° C., e.g., about 80° to about 85° C. Theoretically, adjustment of basicity occurs as soon as the required amount of HCl, aluminum chloride hexahydrate or other material used to make the adjustment is added. Stoichiometrically, this is correct. Not wishing to be bound by theory, however, it appears that there is some reconfiguration or rearrangement of the BAC polymer or the structural distribution thereof upon heating to a temperature of about 60° to about 98° C. This rearrangement or reconfiguration apparently has a beneficial effect on the sulfate bonding reaction. Therefore, it is preferred that the basicity adjustment be carried out at these elevated temperatures. While the material added to make the adjustment can be added at room temperature with subsequent heating to the elevated temperatures, it is preferred that the temperature of the BAC solution be raised to about 60° to about 85° C. prior to such addition. The preferred temperature at which to complete this rearrangement or reconfiguration is about 90° to about 95° C. It will be appreciated by those skilled in the art having access to this disclosure that where adjustment of basicity of a BAC solution is concerned, adjustment in basicity necessarily results in an adjustment of the Al/Cl atomic ratio by virtue of the fact that the materials used to adjust basicity are aluminum and/or chlorine containing compounds.

It will be appreciated by those skilled in the art having access to this disclosure that if no adjustment of the basic aluminum chloride solution is required it is not necessary to heat the solution to 90°–95° C., and the solution can be heated directly to about 75° to about 98° C., e.g., about 80° to about 85° C. After cooling (or heating directly as the case may be) to about 75° to about 98° C. sulfate ion is introduced either as sulfuric acid or aluminum sulfate. Where aluminum sulfate is used, for convenience, the aluminum sulfate is added from a solution containing about 48% by wt. of the aluminum sulfate, a commercially available product. While concentration is not critical, sulfuric acid is preferably added at concentrations of 66° Baume or less, e.g. 60° Baume'.

The sulfate anion should be added at a temperature of about 75° to about 98° C., preferably at a temperature of about 80° to about 85° C. The sulfate anion may be added as the acid, the aluminum salt and mixtures thereof with the following constraints:

1. The addition rate must not result in temperature excursions of greater than 5°;
2. The addition rate must not destabilize the system. Too rapid an addition rate will result in the formation of insoluble basic aluminum sulfate, evidenced by precipitate formation. The addition rate will depend on the concentration of the BAC solution as well as the concentration of the anion solution. The rate required to avoid precipitation is readily determined without undue experimentation for a predetermined reaction mixture. Generally, addition of the anion over at least a one half hour period will avoid precipitation. However, where the anion addition is carried out utilizing the acid, the addition is preferably carried out over a time interval of at least one hour.
3. The total amount of sulfate anion added is such that the ratio of anion to total aluminum in the final reaction mixture is about 0.05/1 to about 0.20/1, preferably, about 0.122/1 to about 0.150/1

As used in the specification and claims with respect to sulfate ion addition, the term "controlled rate" means that the constraints described in numbered paragraphs 1 & 2 above are met.

It will be appreciated by those skilled in the art that where the anion is added as the acid, the heat of solution will result in a temperature increase. Conversely, the addition of an aluminum salt solution will result in a temperature decrease unless the solution is heated before addition to the reaction mixture. However, even where the solution is brought up to temperature to avoid a temperature excursion. it is necessary to add the solution at a controlled rate to avoid the effect described in paragraph 2, above.

After addition of the sulfate ion solution the system is maintained at 75°–98° C., preferably 75°–85° C., for about 60 minutes to about 24 hours; typically two to twenty-four hours, e.g., six to 12 hours. Not wishing to be bound by theory, it is believed that this extended heating period after sulfate ion addition, is required in order to form sulfate ligands bonds. Mixing should be maintained throughout the heating period. The solution is preferably then cooled to about 40° C. over about a twelve hour to twenty four hour period. While the solution can be diluted to any desired concentration at this point, it is preferred that the solution be aged for about 2 to 18 hours after its temperature has been reduced below 40° C. before dilution. Dilution below an $Al^{+3}$ concentration of 4.0 wt. may result in clouding of the solution, and ultimately to precipitation of insolubles. Preferably, the solution is not diluted below an $Al^{+3}$ concentration of 4.5 wt. %.

The solution of product of this invention will be clear, and depending on its characteristics can remain clear indefinitely. Under certain conditions of concentration, basicity and $SO_4/Al$ ratio, failure to dilute may result in the generation of solid precipitate after the cooled solution has been standing for 24 hours or longer. These solution must be diluted to remain stable. Where the aluminum content of the solution measured as $Al^{+3}$ is greater than 8.4%, the Al/Cl atomic ratio is in the range of about 0.8 to about 1.0 and $SO_4/Al$ ratios of greater than 0.12 dilution of the solution may be required. Generally, dilution to reduce the solids concentration by about 10 to 20 wt. % of its original value will be sufficient to promote long term stability.

While it is possible to determine empirically which solutions must be diluted by carrying out the process under fixed conditions, waiting at least 24 hours, preferably, about 2 to about 5 days, to determine whether or not clouding occurs, and if so, rerunning the reaction with different dilutions until stable solutions are achieved, it is more practical to dilute to the $Al^{+3}$ concentrations found to promote stability regardless of the reaction conditions selected. In carrying out the dilution process the water should be added at a moderate rate with adequate mixing to ensure that the solution is homogeneous without stratification or areas of high concentration. In general, where the source of sulfate ion is alum, it is preferred that the product stream be diluted to an $Al^{+3}$ concentration of less than 7.0. Where the sulfate ion source is sulfuric acid it is preferred that the solution be diluted to an $Al^{+3}$ concentration of less than 8.0%, preferably less than 7.5 wt. %.

The advantages of the instant invention may be more readily appreciated my reference to the following examples.

EXAMPLE 1

350.6 grams of a 50 wt. %, 5/6 basic BAC analyzing 12.39% aluminum and 8.27 wt. % chlorine was placed into a one liter flask fitted with a stirrer and reflux condenser. The solution was heated to 80° C. prior to the drop-wise addition of 136.8 grams of 20° Baume HCl over a seven minute period. The temperature was increase to 95° C. and held there for one hour with continuous mixing. The temperature was then reduced to 80–85 degrees.

31.3 grams of 60° Baume sulfuric acid was then added over a 12 minute period. The temperature was maintained at about 80°–85° C. for an additional 30 minutes. Then heating was discontinued. The solution passively cooled to a temperature of 40° C. over a two hour period. Mixing was continuous over the entire reaction time.

281.2 grams of room temperature water was added to the reaction mixture, with continuous mixing, after the reaction mixture had cooled to below 40° C. The finished solution was clear, and no precipitation occurred over a thirty day period. The solution analysis was as follows:

| | |
|---|---|
| Aluminum - 5.49% | Chloride - 8.84% |
| Suflate - 2.93% | Al/Cl (atomic) - 0.82 |
| $SO_4/Al$ molar ratio - 0.150 | |

EXAMPLE 2

The procedure of Example 1 was repeated using 431.5 grams of a 50% solution of BAC (Al=12.35%, Cl=8.27%) and 204.48 grams of HCl. The HCl addition was carried out over a ten minute period at a temperature of 60° C. The reaction temperature then was increased to 90°–95° C., and held there for about 20 minutes. After reducing the reaction temperature to 80°–85 C., 164.0 grams of 48% w/w of commercial grade aluminum sulfate solution (Al=4.45%) was added drop-wise over a 40 minute period. After an additional 30 minutes at 80°–85° C., with continuous mixing, heating was discontinued. The reaction mixture was allowed to cool passively with continuous mixing for 16 hours until the temperature dropped to about room temperature, i.e., 24° C. 131.3 grams of water at room temperature was then added while mixing was continued. The solution concentration was reduced to 85.9% of its original concentration by the addition of water. The finished solution was clear and free of precipitates, and analyzed as follows:

| | | | |
|---|---|---|---|
| Al = 6.50% | Cl = 10.69% | Sulfate = 4.18% | Al/Cl = 0.80 |
| | $SO_4/Al$ = 0.181 | | |

EXAMPLE 3

569.44 grams of a 50% solution of 5/6 basic BAC was added to a one liter beaker fitted with a stirrer and a reflux condenser. The solution was heated to 60° C. with mixing, and 176.4 grams of 20° Baume HCl was then added, drop-wise, over a twenty minute period. The reaction mixture temperature was then increased to 90°–95° C. and maintained at that temperature for about 45 minutes. The temperature was decreased to 80°–85° C. and 54.08 grams of 60° Baume sulfuric acid was added drop-wise over a 30 minute period. The temperature was maintained at 80°–85° C. for an additional 60 minutes. Heating was then discontinued, and the system was allowed to cool passively over an 18 hour period to a about room temperature. Aliquots of the solution were taken and each diluted to a different concentration. Dilution was made by the addition of water at room temperature, with mixing.

Prior to dilution the solution was clear and had the following stoichiometry:

Al=8.79% Cl=12.83% Sulfate=5.00% Al/Cl=0.90

$SO_4/Al$=0.16

The effect of dilution is shown in Table I.

TABLE I

| DILUTION | Al (%) | 30 DAY STABILITY AT ROOM TEMPERATURE |
|---|---|---|
| Neat | 8.79 | 5–10% precipitated solids |
| 90% | 7.91 | trace solids, less than 0.5% |
| 80% | 7.03 | clear solution |
| 70% | 6.15 | clear solution |
| 62% | 5.45 | clear solution |

While the BAC solutions were adjusted with HCl in the foregoing examples, it will be appreciated by those skilled in the art that the adjustment could have been made utilizing aluminum chloride hexahydrate or a BAC solution having a different Al/Cl atomic ratio than the BAC reactant to be utilized. A significant advantage of this invention is that, unlike prior art methods of producing BACS, there is no significant amount of insoluble byproduct produced. Such byproduct not only increases production cost, but creates environmental problems from the need to dispose of these insoluble materials.

It will be noted that the times utilized in the foregoing examples do not conform strictly to the disclosure. This is not an inconsistency. The discrepancy is a result of the fact that small batches are more susceptible to control of parameters such as mixing. The disclosure and claims on the other hand are directed toward a process which has commercial application on a large batch scale.

While the process of this invention produces a BACS solution substantially free of precipitate, it will be appreciated by those skilled in the art that in production runs minor fluctuations of process conditions from the intended values may occur, resulting in the formation of precipitate. These variations must be controlled so that precipitate formation does not exceed 1% by weight of the total batch. Preferably, reaction conditions are controlled to maintain the level of precipitate, if any, to about 0.5 wt. % or less. At levels significantly greater than 1 wt. % of precipitate the process begins to become uneconomical, and sufficient precipitate is produced to begin to create the environmental problems the process of this invention seeks to avoid.

In another embodiment of the invention the process may be carried out under modified conditions. These conditions include carrying out the sulfating reaction at a temperature of about 90°–95° C. and $Al^{+3}$ concentration less than 7.0. It will be appreciated that this temperature range is above the range previously described as preferred. In this particular embodiment of the invention, in order to utilize this higher temperature range effectively at the lower concentrations, it is preferred that a double adjustment of the BAC be used. The first adjustment is carried out prior to the sulfation step, and the subsequent adjustment is carried out at the conclusion of the anion addition and prior to the addition of calcium ion. In this particular embodiment, unless the adjustment is split into two steps precipitation may occur. Additionally, only a part of the required water is added initially, the remainder being added later in the reaction process. A production run utilizing this modified process is illustrated for a product having the following specifications:

| Aluminum | 5.42 wt. % |
|---|---|
| Chloride | 9.00 wt. % |
| Sulfate | 2.90 wt. % |
| Al/Cl | 0.80 ± 0.03 |
| $SO_4$/Al | 0.148–0.153 |
| S.G. | 1.200 ± 0.01 @ 25° C. |

Materials utilized for the process were:

5/6 Basic conventional aluminum chloride prepared as a 50% solution; (BAC)

20° Baume' HCl

60° Baume sulfuric acid

Process water

Since the sulfate ion is supplied by sulfuric acid the total aluminum is supplied by the BAC. Initially 100% of the BAC and 40% of the total water requirement was added to the reactor. The diluted BAC solution is heated to 70° C. with slow, non-aerating mixing. 75% of the calculated HCl requirement is added over a one hour period. After thorough mixing, the temperature is increased to about 90°–95° C. and all of the required sulfuric acid is added over a seven to eight hour period. Since plant reactors need not be run with reflux condensers in place, water loss will occur through vents, and water must be made up by addition. After completion of the sulfuric acid addition, additional water is added slowly and continuously until the specific gravity is within specification.

During the heating period, the batch is analyzed for Adjustments that are required to attain product specifications are preferably made over the first 10–12 hours of heating after completion of the sulfate ion addition. A final adjustment of the specific gravity is made after the heating period and prior to cooling the batch.

If adjustment of $SO_4$/Al ratio is required care must be taken not to add an excess of sulfate, since precipitation will result. The remaining 20° Be HCl should then be added. After thorough mixing, heating is terminated and the batch is allowed to cool to about 60° C. A suspended solids content of 1% of the total batch size by weight or less is acceptable. If any suspended solids are present filtration without a filter aid can be carried out after the batch has cooled below 60° C.

An effective water treatment coagulant should destabilize and precipitate the maximum amount of suspended matter in the water utilizing hte least amount of hydrolizable cationic metal ion, e.g., aluminum. Furthermore, it is desirable to produce a high density floc to ensure rapid settling. Additionally, it is desirable to have rapid floc onset. Since the floc is removed by filtration hte floc must have a high shear strength or cohesiveness. It has been surprisingly found that these objectives can be achieved and the effectiveness of the BACS improved by controlling the iron content of the BACS solution. The total iron content should be about 75 to about 250 ppm, preferably about 160 to about 190 ppm. Those skilled in the art will appreciate that both BAC and aluminum sulfate can contain iron in varying amounts. It is therefore, necessary to first confirm the iron content of the raw materials of the reaction before making additions of iron ion to the reaction system. When required the addition of iron can be accomplished by the addition of a water soluble iron salt. Illustrative, non-limiting examples of such iron salts are ferric chloride and ferric sulfate.

The additional iron is introduced prior to the sulfate addition and preferably prior to Al/Cl atomic ratio adjustment. Ferric chloride forms a yellow solution. If the solution is added prior to sulfate anion addition, the yellow color dissipates. If on the other hand the solution is added to the BACS solution after anion addition is completed, the solution remains yellow, evidencing the fact that the iron has not been incorporated into the polymer formed. Such an addition has no utility for the purpose of this invention.

It has been found that while the product of the process disclosed is useful in water treatment, it is not as efficacious as desired for cold water treatment, e.g., water temperatures of below 10° C., and low alkalinity water. In order for the BACS formed from BAC to be effective in cold water it has been found necessary to introduce calcium ion into the system. The addition of calcium as ion results in overall floc formation efficiency and improved cold water efficiency. It will be appreciated by those skilled in the art having access to this disclosure, that calcium sulfate dihydrate, calcium hydroxide and calcium carbonate are sparingly soluble in water. They are, however, slightly more soluble in the BACS solution. In order that the addition of calcium ion be effective for its intended purpose and to avoid any precipitate formation it is necessary to add calcium ion in a very limited concentration range. The total calcium ion concentration in the BACS should be about 0.1 to about 0.4 weight percent, typically, about 0.20 to about 0.25 weight percent. Where the sole source of calcium is calcium sulfate dihydrate, the calcium content of the BACS is limited to the range of about 0.10 to about 0.15 because of the limited amount of the calcium sulfate which can be incorporated into the system. In one embodiment the calcium ion is added in the form of a slurry of the sulfate and carbonate in the predetermined amounts to achieve the desired concentration. Calcium hydroxide can be prepared from the oxide by slaking to form a slurry.

As used in the specification and claims the term "calcium carbonate" is intended to include all grades of calcium carbonate including dolomitic grades which contain minor amounts of magnesium carbonate, magnesium hydroxide or mixtures thereof. We prefer to utilize USP grade of calcium carbonate because some commercial grades contain impurities which are insoluble, and add to filtration requirements which it is preferred to avoid. We preferably incorporate a minor amount of magnesium carbonate, e.g., Ca/Mg mole ratio of about 3/1 to about 4/1, e.g., about 2/1 to about 3/1, which is reflective of the ratios of calcium to magnesium found in nature, to the USP grade of calcium carbonate. While there is no conclusive evidence, not wishing to be bound by theory, it appears that magnesium may be involved in the formation of additional ligand bonds. The magnesium can also be added as the hydroxide.

It has also been found that water soluble calcium chloride can be utilized as a calcium source. It has additionally been found that by using the combination calcium chloride and calcium sulfate dihydrate, these compounds can contribute a portion of the anion for the purpose of achieving the desired sulfate ion concentration as well as to adjust the Al/Cl atomic ratio using the calcium chloride as a minor source of chloride ion. It will be appreciated by those skilled in the art having access to this disclosure that a mixture of calcium carbonate and calcium sulfate dihydrate, or calcium chloride and calcium sulfate dihydrate can be utilized.

Notwithstanding the use of calcium sulfate dihydrate and calcium chloride in the process of this invention, the primary source of sulfate ion for the sulfation process is the acid or aluminum salt, and the primary source of chloride is HCl, aluminum chloride, or a BAC having a different Al/Cl atomic ratio which is utilized in adjusting the Al/Cl atomic ratio.

In calculating the sulfate anion concentration to be contributed by the acid or aluminum salt it is necessary to take into account the sulfate ion contributed by the calcium sulfate so as not to exceed the range specified in numbered paragraph 3 above. Similarly in adjusting the Al/Cl atomic ratio the amount of chloride contributed as calcium chloride must be considered in order to maintain the Al/Cl atomic ratio within the desired range, as described above.

When the calcium ion is added in the form of a slurry, the calcium slurry typically has a solids content of about 5 to about 10 weight percent. Direct addition of the powdered calcium salts are preferably avoided since it will result in insoluble particles. Additionally, the slurry must be added at a controlled rate to avoid insoluble particle formation in the BACS solution. Typically, the slurry is added over at least a one hour interval, e.g., one to two hours, with good mixing. Mixing is continued until substantially all of the calcium salts are dissolved, e.g., for about an additional two hours to insure that all of the calcium salts have been solubilized. Further mixing may be desirable if it appears that solublization is not complete. Not wishing to be bound by theory, it is believed that solublization occurs as a result of reaction of the calcium salts with the anionic residuals of the BACS. Whenever the calcium slurry contains calcium carbonate the slurry is preferably added at temperatures between about ambient and about 45° C. Higher temperatures may result in undesirable precipitation reactions. Where the slurry contains only calcium sulfate dihydrate or the dihydrate in combination calcium chloride the slurry addition can be made at the temperature at which the sulfate anion is added using the acid or aluminum salt. However, such a slurry can be added at a reduced temperature.

Where the BAC solution used in the process is a 5/6 basic BAC, it is necessary to adjust the Al/Cl atomic ratio to about 1.2 to about 0.70. The BACS solution can be finished by the addition of water to adjust the concentration of BACS in solution. The specifications for the improved BACS of this invention are:

| Broad Range (% w/w) | Preferred Range (% w/w) |
|---|---|
| Al = 4.5 to 8.00% | Al = 5.30 to 5.60% |
| Cl = 7.8 to 11.00% | Cl = 8.25 to 9,25% |
| $SO_4$ = 2.20 to 3.80% | $SO_4$ = 2.60 to 2.90% |
| Ca = 1.0 to 0.4% | Ca = 0.15 to 0.25% |
| Fe = 0.01 to 0.03% | Fe = 0.015 to 0.020% |
| S.G = 1.18–1.26 @ 25° C. | S.G = 1.19–1.22 @ 25° C. |

Preferred Al/Cl atomic ratio = 0.8100/1 to 0.8225/1
Preferred $SO_4$/Al atomic ratio = 0.1375 to 0.1500/1

As noted above where the calcium carbonate compound contains no magnesium, a magnesium compound is preferably added. The specific gravity ranges shown apply whether or not calcium and iron are included in the BACS.

The following example illustrates the invention utilizing aluminum sulfate as the sulfate ion source.

EXAMPLE 4

A one kilo batch of improved BACS was prepared in the following manner:

TABLE II

| Component | Quantity wt. % | grams |
|---|---|---|
| 5/6 Basic BAC | | |
| 50% wt. solution | 40.21 | 402.1 |
| 20° Be' HCl | 17.30 | 173.0 |
| Alum 48% soln. | 10.98 | 109.8 |
| $CaSO_4.2H_2O$ | 0.45 | 4.5 |
| $CaCO_3$ | 0.25 | 2.5 |
| $FeCl_3$ (42.9% w/w soln.) | 0.12 | 1.2 |
| Water | 30.69 | 306.9 |

A one-liter glass reaction flask was fitted with a reflux condenser a stirrer and a heating mantel. 100 grams of water was charged to the flask together with the 402.1 grams of 5/6 BAC. With mixing at room temperature the 1.2 grams of ferric chloride solution was added. Mixing was continued for about thirty minutes to ensure complete integration of the iron into the system. The temperature of the reaction mixture was then increased to 60° C. and 95% of the total HCl was added (164 grams) over about 30 to 45 minutes to adjust the basicity of the BAC. The temperature was then increased to about 82°–85° C. The aluminum sulfate solution (109.8 grams) was then added at a rate of approximately 1.4 ml/min., the total addition time being approximately one hour. The temperature was maintained with continuous mixing for about 12 hours. Then the remaining HCl (8.6 grams) was added. The temperature was reduced to 40 C. slurry comprising 4.5 grams of calcium sulfate dihydrate and 2.5 grams of calcium carbonate in one hundred grams of water. The slurry was added to the reaction mixture at a rate of about 1 ml/min. with continuous mixing. The slurry addition was completed in about two hours. After addition of the calcium slurry was completed, heat was discontinued and mixing was maintained for about two hours. The balance of the water (106.9 grams) was then added to complete the batch.

The HCl addition was made in two parts to avoid overshooting the desired Al/Cl atomic ratio. Generally, the ratio will be determined by analysis before addition of the remaining acid, or other material utilized to adjust the ratio.

EXAMPLE 5

This example illustrates the use of sulfuric acid as the sulfate anion source. A one kilo batch was prepared using the following materials:

TABLE III

| Component | Quantity wt. % | grams |
|---|---|---|
| 5/6 BAC 50% | 44.23 | 442.3 |
| 20° Be' HCl | 16.31 | 163.1 |
| 60° Be' $H_2SO_4$ | 3.35 | 33.5 |
| $FeCl_3$ soln. | 0.12 | 1.2 |
| $CaSO_4.2H_2O$ | 0.45 | 4.5 |
| $CaCO_3$ | 0.25 | 2.5 |
| Water | 35.29 | 352.9 |

A one liter glass lined reaction vessel was fitted with a mixer, heating mantel and reflux condenser. 100 grams of water and 442.3 grams of BAC were charged into the vessel. With mixing, 1.2 grams of ferric chloride solution (42.9% $FeCl_3$ w/w) was added at ambient temperature. Stirring was continued for an additional 30 minutes. The reaction mixture was then heated to 60° C., and 95% of the total HCl was added (154.9 grams) over a 30–45 minutes time interval with constant stirring. The temperature was then increased to 82°–85° C. The sulfuric acid (33.51 grams) was then added at approximately 0.35 ml/min., the total amount being added over a one hour interval. The temperature was maintained for 12 hours with continuous mixing, after which the remaining HCl (8.16 grams) was added. The temperature was then lowered to 40° C. A slurry comprising 4.5 grams of calcium sulfate dihydrate and 2.5 grams of calcium carbonate in 100 grams of water was prepared. The slurry was added to the reaction mixture at a rate of about 1.0 ml/min. with continuous mixing, addition time being about two hours. After addition of the slurry, heating was discontinued and mixing continued for about two hours. The reaction mixture was then diluted by the addition of 152.9 grams of water.

While the above examples illustrates the invention there are certain parameters which should be met in order to achieve the objectives of the invention. The BAC concentration in the initial reaction mixture should be about 4.0 to about 12.5% as $Al^{+3}$ preferably about 90 to about 12.5% At the time of addition of the sulfate ion the Al/Cl atomic rtio should be about 1.2/1 to about 0.70/1, preferably about 1.00 to about 0.70 to 1. The method of preparation of the BAC is not critical, the Al/Cl atomic ratio can be achieved directly or by adjustment.

As has been stated above the Al/Cl atomic ratio can be adjusted using HCl, aluminum chloride hexahydrate or a BAC of a different Al/Cl atomic ratio than the starting material. In one embodiment of the invention the adjustment of Al/Cl atomic ratio is accomplished in two steps. This is a particularly advantageous method where the BAC concentration is such that the $Al^{+3}$ is about 7.9% or greater. In this modification of the process the BAC is adjusted to an initial Al/Cl atomic ratio of about 1.2 to about 0.91. After the sulfate anion addition is made and before the calcium salt addition is made a further adjustment is made to reduce the Al/Cl atomic ratio to about 0.9 to 0.70.

As used in the specification and claims the term "substantially free" as used in reference to precipitate content of the process product stream, means the product stream contains less than about 1.0 wt. % of such precipitate. Typically, in a well controlled reaction the product stream will contain less than about 0.03 wt. % precipitate

What is claimed is:

1. A process for preparing a solution of a basic aluminum hydroxychlorosulfate which comprises heating a solution comprising an aluminum containing compound, wherein the aluminum containing compound is a basic aluminum chloride, wherein the concentration of $Al^{+3}$ is about 4.0 to about 12.5 wt. %, to a temperature of about 75° to about 95° C.; the Al/Cl atomic ratio being about 1.2/1 to about 0.70/1, adding a sulfate anion containing compound selected from the group consisting of sulfuric acid, aluminum sulfate and mixtures thereof, to the basic aluminum chloride solution at a rate, such that (1) the addition rate does not result in temperature excursions of greater than 5° C., and (2) the addition rate does not result in precipitate formation, in an amount such that the molar ratio of sulfate ion to aluminum in the reaction mixture is about 0.05 to about 0.20, the sulfate ion addition being carried out over a time interval of at least one half hour, the temperature of the reaction being maintained at a temperature of about 75° to about 98° C. for about two hours to about 24 hours after the completion of the addition of sulfate anion; adding a calcium containing composition selected from the group consisting of (1) calcium carbonate, (2) calcium sulfate dihydrate, (3) calcium hydroxide (4) calcium sulfate dihydrate in combination with a second calcium compound wherein the second calcium compound is calcium carbonate or calcium chloride, and (5) mixtures thereof, at a rate, such that precipitation does not occur, with mixing, in an amount such that the concentration of calcium ion is about 0.1 to about 0.4 wt. percent; the calcium ion addition being carried out over at least a one hour interval; continuing the mixing until all of the calcium salt has been solublized, and recovering the basic aluminum hydroxychlorosulfate solution product, said product being substantially free of precipitate.

2. The process according to claim 1 wherein the Al/Cl atomic ratio of the basic aluminum chloride is initially greater than 1.2/1, including the additional step of making an adjustment of the Al/Cl atomic ratio to about 1.2/1 to about 0.70/1 by heating the basic aluminum chloride solution to a temperature of about 60° C. to about 98° C. with the subsequent addition of an adjustment compound wherein the compound is HCl, aluminum chloride hexahydrate, a basic aluminum chloride having a different Al/Cl atomic ratio from that of the basic aluminum chloride initially utilized or mixtures thereof in an amount sufficient to cause the adjustment, said adjustment being made prior to the sulfate anion addition.

3. The process according to claim 1 wherein the basic aluminum chloride solution is adjusted to an iron content of about 75 ppm to about 250 ppm by the addition of a water soluble iron salt, the iron content being adjusted prior to sulfate ion addition.

4. The process according to claim 1 wherein the Al/Cl atomic ratio is about 1.0/1 to about 0.70/1.

5. The process according to claim 1 wherein the Al/Cl atomic ratio of the basic aluminum chloride solution is initially greater than 1.0/1, the additional step, prior to adjusting the temperature of the solution of basic aluminum chloride to about 75° to 98° C., preliminary to the addition of sulfate anion, of making an adjustment of the Al/Cl atomic ratio to about 1.0/1 to about 0.70/1 by adjusting the temperature of the basic aluminum chloride solution to a temperature of about 60° C. to about 98° C. with the subsequent addition of HCl, aluminum chloride hexahydrate, a basic aluminum chloride of different Al/Cl atomic ratio or mixtures thereof in an amount sufficient to cause the adjustment, thereafter, adjusting the temperature of the solution to about 90°–95° C., and maintaining that temperature for a time sufficient to complete the adjustment reaction said adjustment being made prior to the anion addition.

6. The process according to claim 1 wherein the sulfate anion/$Al^{+3}$ ratio is about 0.122/1 to about 0.150/1.

7. The process according to claim 1 wherein the sulfate anion is added at a temperature of about 80° C. to about 85° C.

8. The process according to claim 1 wherein the calcium ion concentration is about 0.20 to about 0.25 wt. %.

9. The process according to claim 1 wherein the sulfate anion containing compound is sulfuric acid, the sulfate ion addition being carried out over a time interval of at least one hour.

10. The process according to claim 3 wherein the water soluble iron salt is ferric chloride or ferric sulfate.

11. The process according to claim 1 wherein the calcium ion concentration is about 0.15 to about 0.25%.

12. The process according to claim 1 wherein the calcium ion is introduced from a slurry of a mixture of calcium chloride and calcium sulfate dihydrate.

13. The process according to claim 1 wherein the calcium sulfate dihydrate contributes calcium ion in an amount of about 0.04 to about 0.15%, the balance being contributed by a second calcium compound wherein the second compound is calcium carbonate or calcium chloride.

14. The process according to claim 13 wherein the calcium sulfate dihydrate contributes calcium ion in an amount of about 0.08 to about 0.12%, the balance being contributed by calcium carbonate.

15. The process according to claim 14 wherein the total calcium concentration is about 0.20 to about 0.25%.

16. The process according to claim 1 which includes the additional step of diluting the reaction mixture with water after completion of the sulfate addition and subsequent to cooling the basic aluminum hydroxychlorosulfate solution to a temperature below 40° C. to reduce the $Al^{+3}$ concentration.

17. The process according to claim 16 wherein the reaction mixture is cooled to a temperature below 40° C. and aged for about 2 to about 18 hours before dilution.

18. The process according to claim 3 wherein the BAC solution is adjusted to an iron content of about 150 ppm to about 200 ppm by the addition of a water soluble iron salt.

19. The process according to claim 2 wherein the Al/Cl atomic ratio is adjusted at a temperature of about 90° to about 95° C.

20. The process according to claim 1 wherein the sole calcium source is calcium sulfate dihydrate and the calcium concentration is about 0.10 to about 0.15%.

21. The process according to claim 1 wherein the calcium containing composition includes calcium carbonate, and the reaction mixture is cooled down to at least 45° C. prior to the addition of the calcium composition.

22. The process according to claim 1 wherein the calcium containing composition comprises a mixture of calcium carbonate and calcium hydroxide.

23. The process According to claim 1 wherein a magnesium compound is added to the calcium containing composition.

24. The process according to claim 23 wherein the magnesium compound is magnesium carbonate, magnesium hydroxide or mixtures thereof.

25. The process according to 24 wherein the magnesium compound is added in amount sufficient such that the mole ratio of calcium to magnesium is about 2/1 to about 4/1.

26. The process according to 24 wherein the magnesium compound is added in amount sufficient such that the mole ratio of calcium to magnesium is about 2/1 to about 3/1.

27. The process according to claim 1 wherein a magnesium compound is incorporated into the calcium containing composition prior to its addition to the reaction mixture.

28. The process according to claim 27 wherein the magnesium compound is added in an amount sufficient to adjust the mole ratio of calcium to magnesium is about 2/1 to about 4/1.

29. The process according to claim 27 wherein the magnesium compound is added in an amount sufficient to adjust the mole ratio of calcium to magnesium is about 2/1 to about 3/1.

30. The process according to claim 27 wherein the magnesium compound is magnesium carbonate, magnesium hydroxide or mixtures thereof.

31. The process According to claim 3 wherein a magnesium compound is added to the calcium containing composition.

32. The process according to claim 31 wherein the magnesium compound is magnesium carbonate, magnesium hydroxide or mixtures thereof, the magnesium compound being added in an amount sufficient to adjust the mole ratio of calcium to magnesium is about 2/1 to about 4/1.

* * * * *